United States Patent
Blevin et al.

(10) Patent No.: US 7,661,094 B2
(45) Date of Patent: Feb. 9, 2010

(54) REAL-TIME SOFTWARE DIAGNOSTIC TRACING

(75) Inventors: John Harris Blevin, Parsippany, NJ (US); Richard Wayne Buskens, Robbinsville, NJ (US); Douglas Streeter Daudelin, Hackettstown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 782 days.

(21) Appl. No.: 11/125,952

(22) Filed: May 10, 2005

(65) Prior Publication Data

US 2006/0259830 A1    Nov. 16, 2006

(51) Int. Cl.
*G06F 9/44* (2006.01)
(52) U.S. Cl. .................... 717/130; 717/128
(58) Field of Classification Search .......... None
See application file for complete search history.

(56) References Cited

U.S. PATENT DOCUMENTS

| | | | | |
|---|---|---|---|---|
| 4,802,165 | A * | 1/1989 | Ream | 714/38 |
| 5,121,489 | A * | 6/1992 | Andrews | 714/38 |
| 5,682,328 | A * | 10/1997 | Roeber et al. | 702/187 |
| 5,983,366 | A * | 11/1999 | King | 714/38 |
| 7,216,341 | B2 * | 5/2007 | Guarraci | 717/127 |
| 7,278,058 | B1 * | 10/2007 | Narisi | 714/38 |
| 2002/0087949 | A1 * | 7/2002 | Golender et al. | 717/124 |

OTHER PUBLICATIONS

Vislogubov et al. Diagnostic Software with WEB Interface for Teaching Purposes. Proc. of the 9th Biennial Baltic Electronics Conference, Oct. 3-6, 2004, Tallinn pp. 255-258.*

* cited by examiner

*Primary Examiner*—Tuan Q Dam
*Assistant Examiner*—Cheneca P Smith

(57) ABSTRACT

Techniques for tracing the real-time operation of software for the purposes of testing, debugging, or performance analysis are disclosed. Diagnostic instrumentation for generating records containing details of software operation is incorporated in the software by inserting calls to diverse macros or inline functions. Each macro takes an argument specifying both a subsystem and a category of instrumentation within the subsystem. Based on the specified subsystem and category, the instrumentation can be included or excluded from the compiled object code and, if included, can be dynamically enabled at run-time. Disabled instrumentation does not result in a function call, but only a single, inline "if," thereby reducing overhead. One macro accepts both software parameters and a custom format specifier describing how the parameters should be displayed. However, the parameters are not formatted during logging, nor is the format specifier included in the record. Instead, the formatting is performed when displayed.

19 Claims, 4 Drawing Sheets

REAL-TIME SOFTWARE DIAGNOSTIC TRACING

FIELD OF THE INVENTION

The present invention relates to computer software and, more particularly, to software diagnostics and methods for diagnosing software.

BACKGROUND OF THE INVENTION

Software development is expensive, and a large proportion of the cost is in testing and debugging, followed by support and maintenance of the delivered product. Real-time software presents a peculiar challenge to test, debug, and support, since it typically operates in an environment where it must service multiple, diverse events, occurring with unpredictable sequence and timing, within rigorous time constraints. Testing and debugging is often most easily done, and for some tests and problems may only be done, in the real-time environment in which the product is designed to operate. Certain tests or performance analyses of the software are best, or are required to be, performed while the software is fully operating in the complete system context, and under severe stresses. The most difficult to find problems may manifest themselves only in such an environment.

Complicated software is naturally divided into subsystems depending on functionality, and typically there is an "assignment" of software developers to specific subsystems, such that certain of those developers are familiar with a given subsystem, but not familiar with others. Each test, debug, or support effort may involve one or a few subsystems out of many. A special class of problems involves "wild writes." A wild write occurs when one subsystem in the software incorrectly writes into a region of memory often unrelated to its own operation. This could cause a different and unrelated subsystem that uses the now-corrupted memory to exhibit unusual or "impossible" behavior.

Support of a product after it is delivered often requires solving problems that arise only in a particular customer's application. Often, such support, or support of later enhancements to the software, faces the added difficulty that it must be done by personnel who were not involved in the original software development and may not even be able to consult with those who were.

Additionally, the processors on which real-time software programs run are typically kept very busy performing the required processing tasks. They typically have only a small proportion of idle time available, or a small margin in certain real-time critical paths, in which to perform other desirable functions such as diagnostic services. This situation is caused by marketplace pressures to produce the lowest-cost hardware solution, together with the human tendency to optimistically underestimate the size and complexity of the final software product.

Testing, debugging, and supporting real-time software can be aided by tools that provide diagnostic information about the operation of the software. Some tools, such as in-circuit emulators, require external hardware to be connected to the system under test. These tools are often costly and time consuming to setup and use, and impractical or impossible to use on a product that is in active use at a customer's site.

Some tools require halting the operation of the software, or at least a thread of control, in order to obtain more detailed diagnostic information, such as the values of various software parameters at specific points during operation. However, the very nature of real-time software precludes the kind of halting that is required to gather the needed information in many cases.

Some tools require software to be instrumented by a utility during an automated addition to the software build process. The utility may generate files for use by other tool utilities that interpret and display the diagnostic information logged by the automatically generated instrumentation. Because at least most of the instrumentation is automatically generated, and does not appear in the software source files, interaction with the instrumentation on an operational software package at run-time (e.g., to specify events upon which the log should be started or stopped) may require using a tool utility that provides a sophisticated graphical user interface (GUI). This type of tool frees software developers from the work of instrumenting their software. There is also the option of leaving expensive diagnostic instrumentation out of the delivered product. The effort to develop and support such tools is large, and significant training is necessary to use them. They may also limit a developer's capability to add custom instrumentation to the software, and increase the effort needed to do so. Gathering diagnostic information from a particular instrumented software load may require obtaining the unique files generated for that specific software load by the instrumentation utility.

Some tools enable developers to easily add instrumentation to their software which will log the diagnostic information of interest in a user-specified format and with explanatory text, and do so in real-time. An example of such a tool would be the C/C++ "printf" utility. With a single line of instrumentation, a developer specifies the data to be logged, along with the formatting and accompanying explanatory text. After formatting the data accordingly, the resultant, formatted record is logged, either in some kind of storage directly accessible by the processor, or by transmitting the formatted record over an interface to be logged by another piece of equipment. These tools are hampered in their ability to provide much of the desired diagnostic information, for several reasons. The formatting step is relatively expensive of processor real-time compared to the amount of processor real-time to get to the next event which generates information of interest. Also, the directly accessible storage is relatively small compared with the desired volume of information. If larger storage has been provided for direct access by the processor, it not only adds to the cost of every product, but also typically has a slower interface, and takes longer to log the same information. Where the formatted records are transmitted over an interface to a separate piece of equipment to be logged, the bandwidth of the interface is much less than the desired logging rate, and the transmission takes additional processor real-time. Further, the presence in the software load of the many format specifiers themselves occupies precious, directly accessible storage space.

To make such tools more useful, some have incorporated means by which the instrumentation may be divided into various categories, wherein the individual categories can be separately enabled to log diagnostic information, while disabled instrumentation adds only the lesser overhead of a function call that does little more than test for enabled status before returning. In this way, a much larger amount of instrumentation can reside in the software, and the user chooses to enable only those categories that are most critical to providing the diagnostic information needed for a particular task. Nevertheless, much compromise is typically necessary for accommodating limitations in processor real-time, storage space, and/or interface bandwidth. If necessary, this diagnostic instrumentation can also be completely left out of the delivered product, while still leaving it in the software source code for building into versions intended for the lab only, by simply defining the instrumenting function name(s) as null macros. However, if that is done, then the familiar tools, previously relied upon, are no longer available when providing customer support and/or when trying to find any tough problems that managed to elude detection until after the product was delivered.

SUMMARY OF THE INVENTION

A diagnostics tool for tracing the real-time operation of software for the purposes of testing, debugging, or performance analysis includes a number of diverse instrumentation macros. (The term "macro" as used herein encompasses macros, inline functions, variable argument macros, and the like.) Diagnostic instrumentation for generating records containing details of software operation is incorporated into the software by inserting calls to the macros. Each macro takes one or more arguments specifying both a subsystem and a category of instrumentation within the subsystem, along with additional arguments, as described below. Based on the specified subsystem and category, the instrumentation can be included or excluded from the compiled object code and, if included, can be dynamically enabled or disabled at run-time. Disabled instrumentation does not result in a function call, but only a single, inline "if," thereby keeping disabled instrumentation overhead to a minimum. Because of this last advantage over the prior art, it is practical to leave extensive instrumentation in the final (i.e., compiled and delivered) software product. Because of the first aforementioned advantage over the prior art, it is practical to leave a small number of specially selected instrumentation categories intended for lab-only use in the source code, while excluding them from (i.e., "compiling them out of") the final software product. It is also practical to obtain high quality, diagnostic information in an operational system by enabling desired, selected categories at run-time.

Each macro also takes an argument specifying an ID, and diagnostic logging can be halted in an arbitrary window around a run-time specified sequence of those ID's. The ability to capture a selected window of relevant diagnostic information enables the use of smaller, faster local memory (used, e.g., in a circular fashion) to log high rates of diagnostic information leading up to the window. (Discussion of memory log operation is outside the scope of the present invention, although such is well known to those skilled in the art.) This also permits the logging rate to be independent of the bandwidth of the interface through which the diagnostic information is accessed and displayed.

Some macros accept arguments specifying both what values should be recorded, as well as a custom formatting and text with which the values should be displayed. However, the formatting is not performed while logging in real-time, but only when subsequently printing a log that has simply recorded the values and a pointer to the format specification. These two aspects of the invention enable software to be more easily instrumented such that diagnostic information is captured and displayed in the most desirable format, while at the same time being efficient of processor real-time and log space. Additionally, the format specification itself, though in the source code, does not need to occupy space in the compiled object code. Further, at run-time, memory regions may be specified whose contents would be monitored and possibly recorded at the time each record is logged, thereby providing information to diagnose problems such as wild writes.

The diagnostics tool requires no special hardware support, enabling use extending from initial testing in a lab environment through to support at a customer's site. The diagnostics tool is easy to use, both in terms of instrumenting the software, and in later collecting diagnostic information from it. Additionally, the diagnostics tool is configured for use without special consideration of the software version that was instrumented. The tool could be used in existing software that has been previously instrumented with prior-art tools. In such cases, the diagnostics tool would be able to capture, with its more efficient mechanism and other benefits, the diagnostic information from the prior-art tools, without replacing or changing lines of legacy instrumentation.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
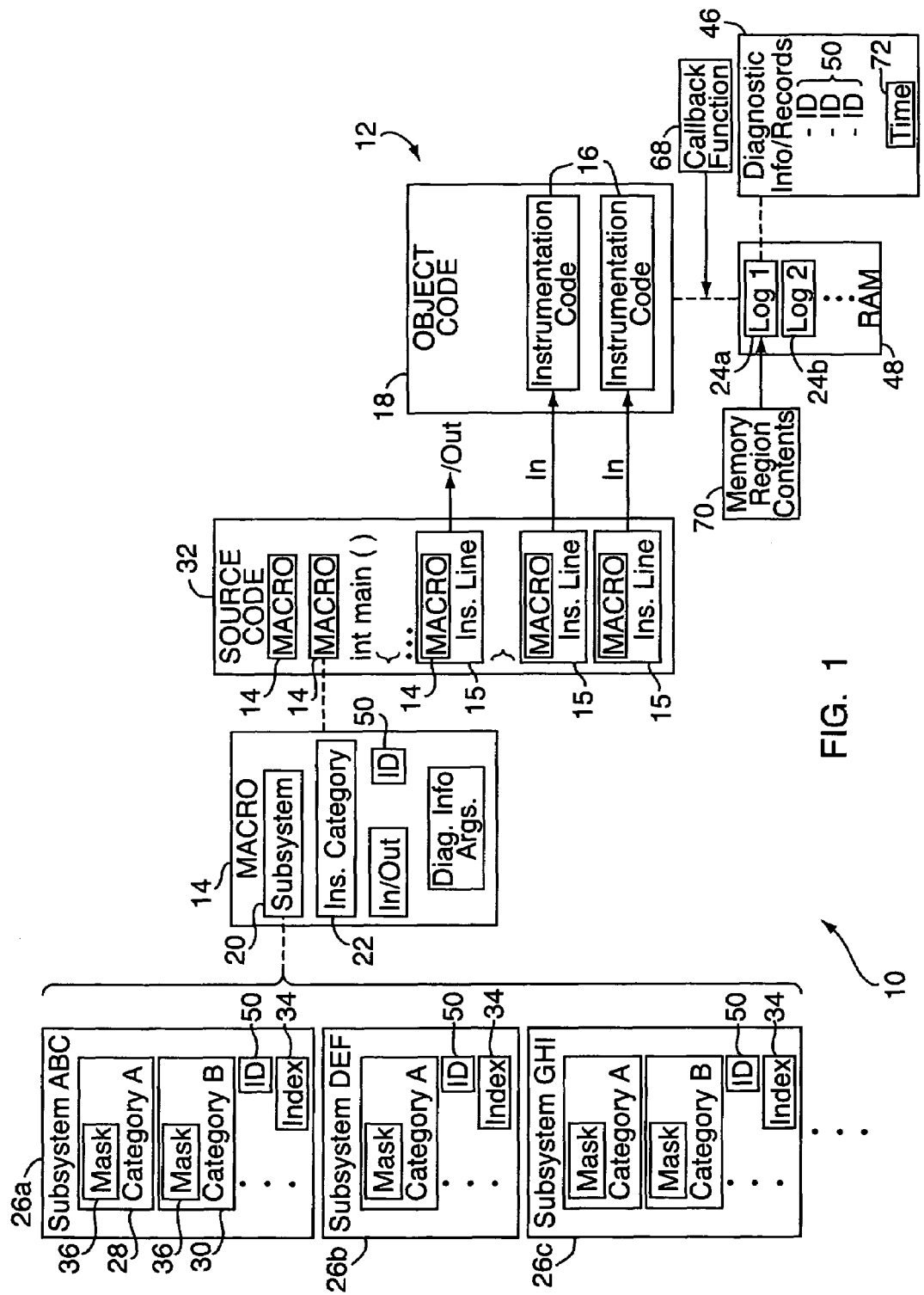
FIG. 1 is a schematic diagram of a software diagnostics tool according to an embodiment of the present invention.
Figure 2:
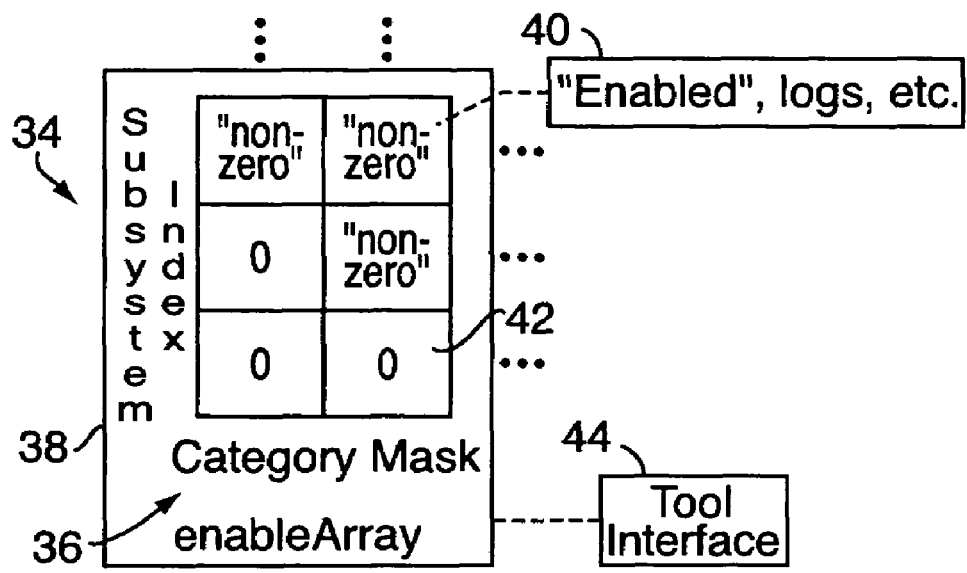
FIG. 2 is a schematic diagram of an "enableArray" portion of the software diagnostics tool shown in FIG. 1.

With reference to FIGS. 1-5, an embodiment of the present invention relates to a software tracing or diagnostics tool 10 for capturing diagnostic information about a software program or system 12 in real-time, and with an enhanced efficiency such that a greater rate, quantity, and quality of desired information can be captured within a given system's constraints on real-time, storage space, and interface bandwidth. The diagnostics tool 10 includes a number of instrumentation macros 14. Each macro 14 is configured to accept one or more arguments whose compile-time value(s) determines whether or not a line of software instrumentation 15 invoking a macro 14 is compiled to form a corresponding instance of instrumentation code 16 in the software object code 18.

Additionally, each macro 14 accepts one or more arguments that specify at least two values or dimensions, a subsystem 20 and an instrumentation category 22 within that subsystem. At run-time, subsets of the instances of instrumentation code 16 in the object code 18 can be disabled or enabled, based on their respective subsystems and categories. In other words, if a source code instrumentation line 15 invokes a macro 14 with arguments specifying a particular subsystem/category, and that particular subsystem/category is later designated for disablement at run-time, then the instance of instrumentation code 16 that resulted from the compilation of that instrumentation line 15 is correspondingly disabled. Each enabled instance of instrumentation code 16, each time it is executed, generates a record to one or more of a plurality of memory logs 24a, 24b that contain the desired diagnostic information. Typically, the instrumentation code 16 calls a function which performs most of the steps necessary to place the record in the memory logs 24a, 24b. If disabled during run-time, the instrumentation code 16 remains present in the compiled software 18, but does not generate any diagnostic information record to the memory logs 24a, 24b, and also does not incur the overhead of a function call during software operation.

Since the present invention can be implemented using inline functions or the like in place of or in addition to macros, as discussed below, the term "macro" as used herein encompasses macros, inline functions, variable argument macros, and the like. Also, by "instance" of instrumentation code, it is meant a logical segment, line, block, or other subset of software code, either contiguous or non-contiguous.

The instrumentation macros 14 each have the same basic template as follows:

ST_MACRO(ST_SUB_CAT,ID, args . . . )

"ST_MACRO" identifies the instrumentation macro of interest. "ST_SUB_CAT" itself represents a macro defined such that it specifies both the subsystem 20, and the category of instrumentation 22 within the subsystem 20. ST_SUB_CAT also specifies whether or not a software instrumentation line 15 invoking the macro 14 is compiled to form corresponding instrumentation code 16 in the software object code 18. For example, say a subsystem "ABC" 26a (i.e., one of a plurality of possible subsystems 26a, 26b, 26c, and so on) has two categories of diagnostic instrumentation: tracing function entries 28, and tracing communicated messages 30. The corresponding instrumentation macros 14 could take for their first argument ("ST_SUB_CAT") either ST_ABC_FUNC_ENTRY or ST_ABC_MESSAGES, respectively. "ID" is an identifier associated with the particular line of instrumentation; it may or may not be unique within or across all subsystems and categories of instrumentation. Also, "args . . . " represents zero or more arguments associated with a specific instance of the ST_MACRO template.

The following is the basic definition of ST_MACRO( ) in C or C++ software, using the GNU CPP C-language preprocessor syntax for variable arguments:

```
#define ST_MACRO(def, args...) ST_MACRO_(def, args)
#define ST_MACRO_(def, args...) ST_MACRO_##def(args)
#define ST_MACRO_OUT(args...)
#define ST_MACRO_IN(subIndex, mask, ID, args...) {\
    if( enableArray[subIndex] & mask ) \
    {\
        ... \
        stLogUtility1(subIndex, ID, args);\
    }\
}
    OR
#define ST_MACRO_IN(subIndex, mask, ID, args...) { \
    if( enableArray[subIndex][mask] ) \
    {\
        ... \
        stLogUtility1(subIndex, ID, args);\
    }\
}
```

What is performed between the innermost brackets "{"and "}" above in a specific ST_MACRO instance depends on the type of diagnostic information the instrumentation macro instance is designed to record. Typically, there would be a function call to a logging utility (represented by "stLogUtility1 ( )" in the above example) which would perform most of the steps necessary to place the record in the memory logs 24a, 24b.

The following are examples of the corresponding definitions of, e.g., ST_ABC_FUNC_ENTRY and ST_ABC_MESSAGES on a pre-processor which supports argument pre-scan, such as the GNU CPP:

```
#define                      OUT, ST_INDEX_ABC, \
ST_ABC_FUNC_ENTRY            ST_ABC_FUNC_ENTRY_MASK
#define                      IN, ST_INDEX_ABC, \
ST_ABC_MESSAGES              ST_ABC_MESSAGES_MASK
```

A pre-processor not supporting argument pre-scan would have the following alternate definitions (which would also work with a pre-processor supporting argument pre-scan):

```
#define ST_MACRO_ST_ABC_FUNC_ENTRY(args...) \
    ST_MACRO_OUT(ST_INDEX_ABC, \
        ST_ABC_FUNC_ENTRY_MASK, args)
#define ST_MACRO_ST_ABC_MESSAGES(args...) \
    ST_MACRO_IN(ST_INDEX_ABC, \
        ST_ABC_MESSAGES_MASK, args)
```

With either variety, if the word "OUT" appears in the definition of an ST_SUB_CAT macro, as it does for the function entry category ST_ABC_FUNC_ENTRY, any software instrumentation line 15 invoking a macro 14 and passing it such a ST_SUB_CAT argument, will produce no corresponding instrumentation code 16 in the object code 18. That is because ST_MACRO_OUT( ) is defined to be null. Conversely, those ST_SUB_CAT macros with the word "IN" appearing in their definition, for example ST_ABC_MESSAGES, when passed by a software instrumentation line 15 to an invoked macro 14, will produce a corresponding instance of instrumentation code 16 in the object code 18.

Also, each subsystem 20 is assigned a unique number called an Index 34. In this case, subsystem ABC 26a has been assigned the number defined by the macro ST_INDEX_ABC. Each category 22 has also been assigned a Mask value 36—a number defined, for example, by the macro ST_ABC_FUNC_ENTRY_MASK.

In regards to the latter, alternate definition of ST_MACRO_IN, as a means for designating whether particular subsystems and categories are enabled or disabled, an array called "enableArray" 38 (see FIG. 2) has two dimensions, one for the subsystem Indices 34 and one for the Mask(s) 36 assigned to the categories 22 of FIG. 1. If an entry 40 in enableArray for a given subsystem and category is non-zero, then that subsystem's corresponding category of instrumentation is enabled for recording. If an entry 42 is zero, then that category is disabled, and the overhead of the corresponding instrumentation code 16 is a single, inline "if."

To elaborate, once compiled, the software object code 18 contains a number of instances of instrumentation code 16, which remain in the object code 18 whether enabled or disabled. Then, at run-time, the user specifies which categories 22 should be enabled in which subsystems 20. Selected subsystems and categories have their corresponding entries updated in enableArray 38. When executing the object code 18 at run-time, each time the processor encounters an instance of instrumentation code 16, an enable/disable test is performed. If the instance of instrumentation code 16 is disabled (i.e., if it corresponds to an instrumentation line 15 that invoked a macro 14 with arguments specifying a subsystem/category that are later designated as disabled in enableArray 38), then that instance of instrumentation code 16 is, in effect, "skipped over," with the overhead of a single "if" statement. Enabled instances of instrumentation code 16 are executed to carry out their respective diagnostic function(s).

The diagnostics tool 10 also includes a tool interface program 44 that enables a user to easily enable or disable the various categories of instrumentation at run-time. The tool interface 44 could also show a user those subsystems that are instrumented in the software object code 18, and the categories of instrumentation that can be enabled for each subsystem. The tool interface could be a utility program, subroutine, or the like operating in conjunction with the object code 18, either as part of the object code 18 or separately therefrom, i.e., as a separate but concurrently operating program. The tool interface 44 could determine which subsystems are instrumented in the object code 18 through a number of possible methods evident to those skilled in the art, such as a means by which instrumented subsystems may register their instrumented status and other details about their instrumentation such as instrumented categories 22 and associated Mask(s) 36, or by using a table populated at compile-time based on the definitions corresponding to the various ST_SUB_CAT categories.

Besides an array such as enableArray 38, other means for designating enablement include lookup tables, lists, indices, or the like. Additionally, the tool interface 44, or a similar interface, is considered such a means (i.e., at a higher level), regardless of the manner in which information relating to the subsystems/categories is stored or organized in memory or otherwise.

When enabled, a non-zero value of an entry 40 in enableArray 38 for a given subsystem 20 and category 22 may carry additional information, such as which of a plurality of logs the category is enabled to. Of course, other arrays could also be accessed within the body of the "if" to provide additional information if desired.

The same Mask value 36 defined by the example macro ST_ABC_FUNC_ENTRY_MASK could also be used by the example ST_ABC_MESSAGES_MASK. If done in this example, then it would not be possible to enable only function entry instrumentation while leaving message instrumentation disabled, since the same subsystem Index and Mask values are used by both macros. If done initially, but later it was desired to give them different Mask values for independent enablement, only the definition of ST_ABC_MESSAGES_MASK would need to change. No instrumentation lines would need to change.

Note that enableArray 38 could also have more than two instrumentation category dimensions, allowing a category 22 to be defined as a combination of more than one subcategory such as Mask and Level, or Function and Entry as below:

```
#define ST_MACRO_IN(subIndex, cat1, cat2, ID, args...){\
    if( enableArray[subIndex][cat1][cat2] ) \
    {\
        ...\
    }\
}
#define                    OUT, ST_INDEX_ABC, \
ST_ABC_FUNC_ENTRY          ST_ABC_FUNC, ST_ABC_ENTRY
```

Instead of a macro, the instrumenting line could be an overloaded inline function "stInLine" as follows:

```
stInLine(ST_SUB_CAT, ID, ...)
#define ST_ABC_FUNC_ENTRY       OUT, ST_INDEX_ABC, \
                                ST_ABC_FUNC_ENTRY_MASK
#define ST_ABC_MESSAGES         ST_INDEX_ABC, \
                                ST_ABC_MESSAGES_MASK
stInLine(OUT, subIndex, mask, ID, ...) {}
stInLine(subIndex, mask, ID, ...) {
    if( enableArray[subIndex][mask])
    {
        ...
    }
}
``` subsystem/category is enabled to, or should be recorded in. Once that value has been retrieved for the enable/disable test, it is available in a processor register for fast reference or additional use. Since both the Index 34 and Mask 36 are hardcoded in the instrumentation line, the compiler is able to efficiently substitute a hardcoded address in the executable object code for the element of enableArray 38 to be accessed by the corresponding instance of instrumentation code.

In the first definition of ST_MACRO_IN, where enableArray has only a single dimension, those skilled in the art will recognize that it is still possible to provide the additional information described above that may be provided by a multi-dimension enableArray 38. For example, Mask 36 could select a field of bits in the enableArray[subindex] value which would correspond with the associated category in the specified subsystem. A non-zero value of that field of bits would indicate that the instrumentation is enabled for recording—the "if(enableArray[subIndex] & mask)" test passes, and the code within the body of the "if" is executed to record the diagnostic information. Code within the body of the "if" could examine the values of individual bits in the field of bits which could indicate, for example, which of a plurality of logs However, since compilers often cause inline function arguments to be evaluated before executing any code, this may add the overhead of more than an "if" to the disabled case. Therefore, it may be desirous to use macros, not inline functions, in certain instances. To retain the benefit of a macro's guaranteed, single-if overhead, while also having the benefit of overloaded inline functions (i.e., instrumentation lines that can take variable numbers of arguments and/or appear to give overloaded functionality, and to optionally do that without the overhead of variable argument functions), the instrumentation line may be a variable argument macro which is implemented by calling an overloaded inline function, in the following manner:

```
#define ST_MACRO_IN(subIndex, mask, ID, args...) {\
    if( enableArray[subIndex][mask] ) \
    {\
        stInLine(subIndex, mask, ID, args); \
    }\
}
```

"stInLine" is a set of overloaded, inline functions handling a variety of instrumentation needs by providing a small amount of interface-specific functionality inline as a front-end before calling one of a number of standard functions such as stLogUtility1 ( ) which handle the recording, or logging, of the diagnostic information.

These features enable development teams working on different subsystems to customize instrumentation for their particular subsystem 26a, 26b, 26c without needing to be concerned with, nor getting in the way of, the other development teams, and to do so in a "no-risk" way. Since disabled instrumentation code 16 incurs the overhead of only one "if" of a global variable check (not a function call), the delivered software product can be liberally instrumented. When collecting diagnostic information, all of the system's available resources may be applied to a single subsystem, and even to a category within the subsystem, if desired.

The amount of instrumentation in the delivered product versus that available only in private loads can be determined on a per-category basis by simply changing an ST_SUB_CAT macro definition in a subsystem header file—leaving every instrumentation line 15 untouched. This is beneficial in that it makes the instrumentation "no-risk." Specifically, if it is determined after instrumenting that any category of instrumentation has been instrumented too liberally to be viable in a delivered (or even private) load, that category of instrumentation can be easily removed from the load without affecting any other categories or changing the source code 32 itself.

In the diagnostics tool 10, diagnostic information 46 can be stored in one or both of two circular logs 24a, 24b in on-board RAM 48, though a larger number of logs could be provided. Beneficially, one or both of the logs 24a, 24b may be dynamically created at run-time from the available, free memory space. The starting address of such memory may be specified, to take advantage of special plug-in memory not available in general free space, or having special speed characteristics, or designed to survive a reboot without being erased or overwritten. Categories of instrumentation may be independently and selectively directed to either or both of the logs 24a, 24b. Also, displaying or otherwise communicating the logged information for user examination is independent from the recording of it, and one of the logs can be displayed during the logging process using an information display means (provided, e.g., by a subroutine, or utility program similar to the tool interface 44, or the like). Lower-rate diagnostic information is directed to both of the logs 24a, 24b, while more exhaustive, higher-rate diagnostic information is directed only to log 24b. This enables lower rate diagnostic information to be displayed while the logging is ongoing (e.g., for user-monitoring of significant, high-level events, by displaying log 24a during the logging process), while still capturing the necessary minute details in the larger, higher rate log 24b for later examination. It also enables capturing in log 24a a lower rate subset of diagnostic information spanning a longer period of time than that in the higher rate log 24b.

In each instrumentation line 15, an ID 50 is explicitly specified by the instrumenter. Beneficially, each ID 50 is unique, or unique for a given subsystem 20 and/or category 22 within the subsystem, and is recorded along with the other diagnostic information specified, including possibly the subsystem and/or category. Recording at least the subsystem 20 enables developers in independent subsystems to utilize the full range of ID's without coordinating their use of ID's with that in other subsystems. Additionally, if ID's are not recycled, meaning that an ID uniquely identifying an instrumentation line used in the past is not later used for a modified or new instrumentation line, then the meaning of an ID in the diagnostic information is independent of software version.

The ID's 50 provide an easy way to specify at run-time when to start or stop logging diagnostic information. Such a specification could include a sequence of ID's observed from enabled instrumentation code 16, which may or may not need to be found consecutively, and the number of records to log before and/or after such a sequence has occurred. Information recorded between the start and stop points is referred to as a "window" of diagnostic information. The specification could also include the number of such windows of diagnostic information to be recorded. That is, it may also be specified that conditions for automatically starting or stopping logging be performed repeatedly. This enables limited, local, fast storage space to be used to record the necessary minute details in a window surrounding an event of interest.

The ID's 50 also enable pre- or post-logging processing of records by either tool utilities or custom-made developer functions based on the ability to quantitatively identify the exact line of instrumentation that is being processed. Such pre-processing might include custom filtering of what is logged, custom determination of start or stop conditions, or custom actions to monitor and/or modify software operation, thereby enabling run-time specified software patching to be performed at any of the instrumented points. If provision is made (e.g., through a processor or other hardware generated interrupt or exception) to generate a record upon encountering a run-time specified instruction address, or access to memory, then the previously mentioned capabilities also enable such custom actions to monitor and/or modify software operation upon software events which were not originally instrumented in the source code 32.

The pre-processing referred to above could be accomplished as follows. Before putting each record in the log, a callback function 68 specified at run-time (perhaps a different one for each subsystem or category) is called, if one has been registered. The callback function can do anything the user would like, including generating further records as a result of its processing, and may return an indication that the record should not be logged. At the time of putting each record in the log, a code coverage table (a table recording which instrumenting lines 15 have been encountered) is optionally updated based on some combination of ID, subsystem, and category of the record. Also, according to run-time specified parameters, the contents of a specified region of memory 70 may be examined, and the contents of that memory 70 conditionally or unconditionally recorded as an additional record. For examining the region of memory, examination means may be provided, and, for recordation, a memory record generation means may be used, implemented alone or together as, e.g., appropriately configured instance(s) of instrumentation code or portion(s) thereof, or subroutines or utility programs such as the tool interface 44, or the like. Conditions for the recordation of the memory region's contents might be 1) always, 2) upon seeing it equal to certain specified contents, 3) upon seeing it not equal to certain specified contents, and 4) upon seeing the contents change from what they were at the time of logging the last record. This enables the updating of various parameters, tables, and arrays to be checked during operation without making any special provision in the software. It also enables wild writes to be observed in the context of whatever else is being recorded. That is, it can be determined to the granularity of the traced software operation exactly when the wild write occurred.

Post-processing of diagnostic records might include beautifying the output by parsing, for example, hex dumps of data structures and displaying them in an easy to read format. Note that a different custom post-processing function may be provided and selected to process each record based on the record's generating subsystem 20 or category 22. The ID's 50 enable such post-processing functions to identify, in a way that is independent of software version, which line the diagnostic information is from, and to take different and custom actions for information recorded by different lines. The ID's also provide a handle whereby constant information found in instrumentation lines 15 (e.g., a format specification) can be placed in a file to be used by a post-processor 52. When the post-processor 52 has access to the format specification, for example, that appeared in an instrumentation line 15, by accessing such a file and finding the information associated with the ID associated with the line, then it is no longer necessary to record that information in the log 24*a*, 24*b* along with other diagnostic information associated with the line. The information could be completely removed from the compiled object code 18 itself by simply defining the instrumenting macro 14 such that it does not use the format specifier.

This enables information important to the display of diagnostic information, though not to its recording, to be conveniently placed in the line of instrumentation itself, and yet not take up memory space used by the processor. The provision of a unique, instrumenter-specified ID in each line enables the latest post-processing input file to be used not only with the latest version of instrumented software, but also with any earlier version. This eliminates the problem of locating a post-processing input file that corresponds with the specific version of software under test. Changes to the constant information in existing lines of instrumentation can be handled by various schemes which will be readily apparent to those skilled in the art, such as choosing a new ID for the modified line, and, if desirable, leaving something (e.g., in a comment) which still gives a pre-processor 54 the old ID with its corresponding line.

In summary, the ID's 50 may be used, possibly together with the subsystem and category, to specify sequences upon which to start or stop logging, to generate a record of which instrumenting lines have been encountered (a code coverage table), to invoke special processing at the time of recording, or to invoke special post-processing. They can also be used to identify to post-processing tools some type of constant information that was present in the instrumenting line in the source code but possibly entirely absent from the object code and corresponding record. The start/stop logging sequence may include match-anything elements, may require consecutive or only sequential occurrence, and a start/stop logging stimulus may be further delayed in its action by a dynamically specified number of additional records.

Utilities similar to the C/C++ printf are a mainstay for collecting diagnostic information. In them, a single line of instrumentation specifies both what data to record, along with the custom format with which to display it, and accompanying, explanatory text. It is a favorite of software developers because they can quickly and easily specify exactly what diagnostic information they would like to see, and how they would like to see it. However, there is significant overhead associated with this favorite type of utility. The formatting is done at logging time, and the time to produce the formatted record is usually exacerbated by the overhead of dealing with a variable argument list passed to the utility. The format specification itself increases the size of the object code, and each formatted record takes up a significant amount of log storage space.

The present invention reduces all of the above noted costs of printf-like instrumentation. An instrumentation macro 14 may be provided which supports the full formatting capability provided by printf. However, in the diagnostics tool 10, much faster and space-efficient macros provide printf-like instrumentation capability handling the requirements of most diagnostics cases.

The overhead of dealing with a variable argument list is eliminated by providing an instrumentation macro 14 that either supports a fixed number of arguments of fixed type and of a suitably large number (e.g., possibly with default values for "missing" arguments [if supported by the language] so that dummy values do not need to appear in each instrumenting line), or that provides a set of "overloaded" macros (by the mechanism previously described) each of which handles a fixed number and fixed type(s) of arguments. For example, an overloaded macro supported by seven inline functions could handle the seven separate cases of one argument, two arguments, etc. on up to seven arguments, all of type "unsigned int." Most common types, including pointers to any type, can be cast to the unsigned int type of argument accepted by the macro so that it can successfully compile and record the value(s) for later display in the specified format.

The overhead of formatting during logging, and the significant amount of log storage space taken up by the formatted record, is removed as follows. A format specification means (e.g., an argument passed in an instrumentation line to the instrumentation macro it invokes) is used to specify a format specifier, e.g., a printf-like format specification string or the like. The macro records, without formatting, a format string identifier (e.g., the address of the format specification string in the object code 18), and the values of each of the arguments. When the contents of the log are later displayed or otherwise communicated for user review, a formatting step is performed, based on the format specification string, using a formatting means (e.g., appropriately configured code). This introduces a mild restriction on arguments that may be passed to such highly efficient, printf-like instrumentation macros, namely, arguments which point to character strings may not point to volatile strings.

Figure 3:
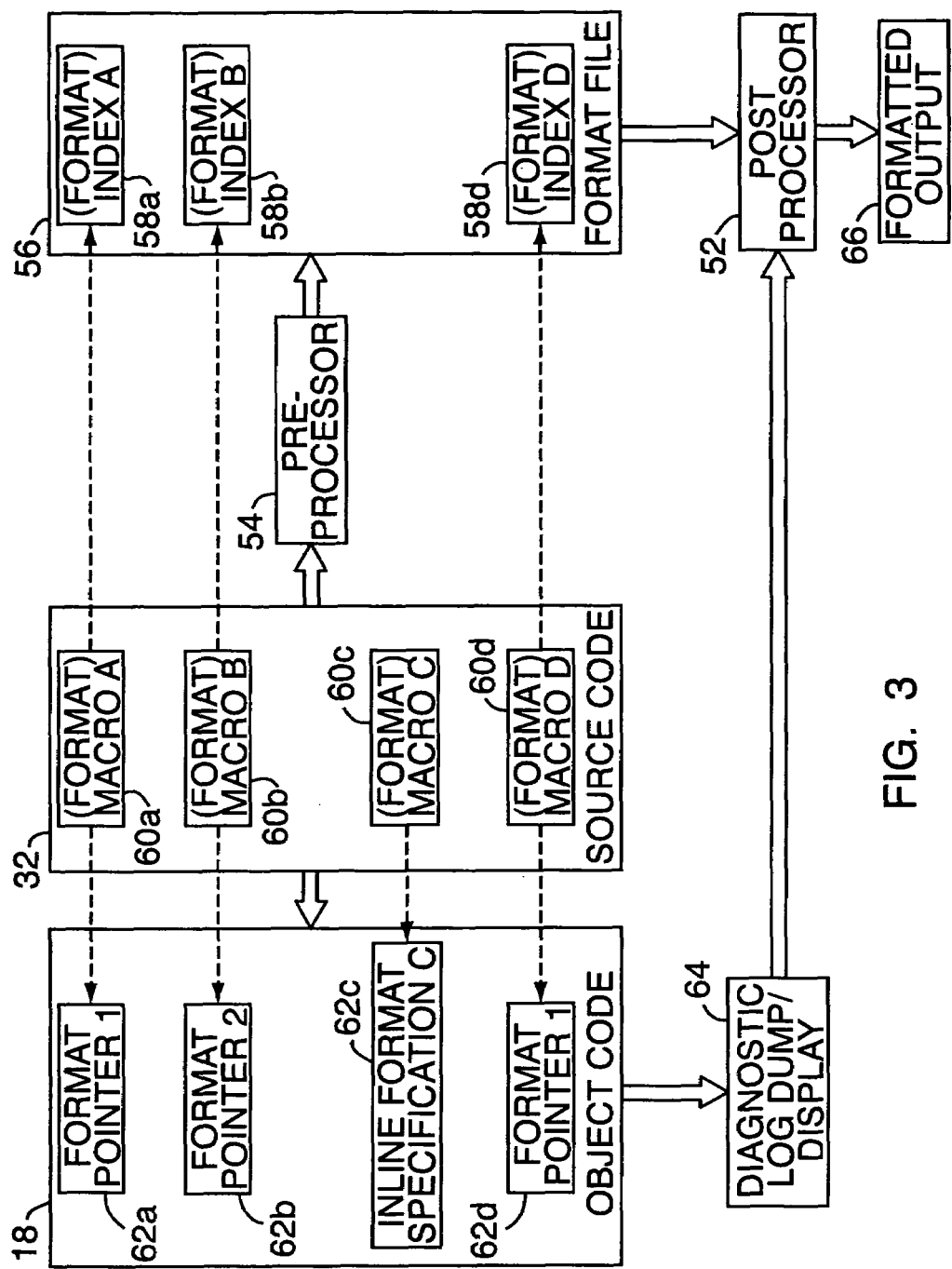
FIG. 3 is a schematic diagram of a format overhead streamlining portion of the software diagnostics tool.

With reference to FIG. 3, the size of the compiled object code 18 will depend, in part, on the number of instrumentation line format specifications contained therein. The compiled size can be reduced at any point in the software lifecycle as follows. A pre-processor 54 goes through the software 32 and creates a file 56 for a post-processor 52 into which inline format specifications 58*a*, 58*b*, 58*d*, found as arguments in instrumentation lines invoking specified instrumentation macros 60*a*, 60*b*, 60*d* are placed, respectively, and indexed by the corresponding ID and subsystem found in each instrumentation line. An unspecified instrumentation macro 60*c* continues to use the inline format specification 62*c* found in an instrumentation line invoking it. However, specified instrumentation macros 60*a*, 60*b*, 60*d* do not use the inline format specifications. Therefore, inline format specifications passed to those macros by instrumentation lines invoking them will not appear in the compiled object code 18. Instead, each macro 60*a*, 60*b*, 60*d* records (along with the values of any arguments) a pointer 62*a*, 62*b*, 62*d* to a corresponding global format specifier which is specific to the number of arguments and argument types handled by the macro. Therefore, format pointers 62*a*, 62*b*, 62*d* alone will appear in the compiled object code 18, each pointing to a possibly different, or possibly the same, global format specifier. A single copy of each global format specifier used by the specified instrumentation macros 60*a*, 60*b*, 60*d* also appears somewhere in the object code 18. For example, the compilation of each instrumentation line 15 calling macro 60*a*, will result in an instance of instrumentation code in the object code 18 which records a pointer 62*a* pointing to the global format specifier which handles the number of arguments and argument types passed to macro 60a. All invocations of macro 60a may point to the same global format specifier. In cases where macro 60a has been designed such that it handles a variety of types and numbers of arguments, it may be that certain invocations of macro 60a cause it to point to one global format specifier, whereas other invocations of macro 60a cause it to point to another global format specifier. Certain macros 60a, 60d may record format pointers 62a, 62d pointing to the same global format specifier. When later dumping or displaying the log contents 64, the global format specifier that has been pointed to will cause the values of the previously recorded arguments to be displayed in a format that the post-processor 52 can conveniently read. Then, the post-processor 52 will look up the desired format specifier corresponding with the particular ID and subsystem in the file 56, and format and output the desired, formatted string 66 accordingly. If there were string arguments passed, whose contents are to be displayed in the final, formatted string, the ASCII contents can either be displayed in the initial dump by virtue of the nature of the macro's format specifier, or only the address of the string might be passed in the initial dump, and the post-processor may communicate with the processor running the software to retrieve the ASCII string contained at that address.

The diagnostics tool 10 may be used for the first time in existing software that contains legacy instrumentation from a different tool. Diagnostic information from the legacy instrumentation can be captured into the new tool's log(s) along with the new diagnostic information directly instrumented with the new tool, without needing to change the (typically thousands of) lines of legacy instrumentation. Where possible, the prior art tool's instrumenting functions are defined in terms of the diagnostics tool's macros. Where that is undesirable or impossible, it may be done through instrumentation of the legacy tool's instrumentating functions themselves, so that, upon enabling, the information is sent to the new tool for logging, and, optionally, only to that tool.

By example, instrumentation of a legacy tool's instrumenting functions is designated to belong to a new subsystem 20, and various instrumentation categories 22 within that subsystem are defined. Where the legacy information to be recorded contains a format specifier, enabling one category in the new subsystem causes the formatted information from every line of such legacy instrumentation to be logged by the new tool. Simultaneously enabling another category causes the formatted information to be logged only by the new tool, eliminating the overhead of logging by the legacy tool. An attempt to generate a corresponding unique ID for each line of legacy instrumentation is made by setting the ID equal to the format specifier address (or some function of it), or by setting it equal to a checksum of the characters in the formatted information. The characters to include in the checksum are reasonably set to the first thirty characters, but can be modified at run-time, if necessary, to start at an arbitrary character location in each formatted line and include an arbitrary number of characters. Where the legacy information to be recorded contains a format specifier, another category of instrumentation eliminates the overhead of formatting, as well as the log storage space needed to record the formatted information, by recording only the format specifier address and the unformatted diagnostic information. In this case, the ID is set equal to some function of the format specifier address, and formatting occurs when the log contents are displayed. Alternatively, the format specifier itself may simply be printed along with the corresponding diagnostic information displayed in a suitable, default way.

Some processors, for example the Motorola 603e, provide the capability to generate an exception—immediately transferring control to an interrupt service routine—upon the occurrence of an instruction fetch to an address that has been programmed into an internal register.

The following is a reference from the Motorola 603e user manual (Section 2.1.2.6 Instruction Address Breakpoint Register (IABR)): "The IABR controls the instruction address breakpoint exception. The IABR[CEA] holds an effective address to which each instruction is compared. The exception is enabled by setting bit 30 of IABR. The exception is taken when there is an instruction address breakpoint match on the next instruction to complete. The instruction tagged with the match will not be completed before the breakpoint exception is taken." Additionally (Section 4.5.15 Instruction Address Breakpoint Exception (0x01300)): "The instruction address breakpoint is controlled by the IABR special purpose register. IABR[0-29] hold an effective address to which each instruction is compared. The exception is enabled by setting IABR [30]. The exception is taken when an instruction breakpoint address matches on the next instruction to complete. The instruction tagged with the match is not completed before the instruction address breakpoint exception is taken. The breakpoint action can be one of the following: . . . Trap to interrupt vector 0x01300 (default) . . . "

Such a capability could alternatively be provided by external hardware, if not available on the processor itself. It is also possible to provide the capability of generating an exception upon writing specified contents to a specified memory location. In this illustrative embodiment, the diagnostics tool 10 provides a run-time interface whereby an instruction address, or a sequence of instruction addresses, or a memory location and contents written, or a sequence of memory locations and corresponding contents written, can be specified. It also provides interrupt handling software to process a run-time specified exception of one of the above conditions, and a run-time interface to that handler whereby it may be specified whether to optionally generate a diagnostic record of specified type and ID, or to setup the exception generating hardware to monitor for the next-in-sequence condition. When a specified diagnostic record may be generated upon, for example, any specified instruction address, then memory can be monitored as described above upon encountering software events which were not instrumented in the source code. Users are also permitted to register functions at run-time to pre-process records, giving them the ability to take custom actions to monitor and/or modify software operation upon encountering software events not originally instrumented.

A time stamp means 72 (e.g., recording with each record a sample of a simple timer, such as the timer provided in a PowerPC programming environment by the Time Base Register ["Programming Environments Manual," Motorola, MPCFPE32B/AD Revision 2, December/2001, p. 2-15], or the like) may be used to automatically time stamp the diagnostic records 46. The time stamp values may be post-processed to become actual time values by various methods apparent to those skilled in the art. For example, the time-of-day reference to actual time stamp values may be recorded as the first record in the circular log 24a, 24b. Upon each log wrap, an automatic record containing the time-of-day reference is made.

Optionally, the diagnostics tool 10 can be set up so that upon the occurrence of a condition or other stimulus where the logging or recording of diagnostic information is started or stopped, this also causes other logs that may be in progress on other processors in an intercommunicating system of processors to start or stop logging. For example, such an occurrence could be based upon evaluating the ID's 50, as described above.

Figure 4:
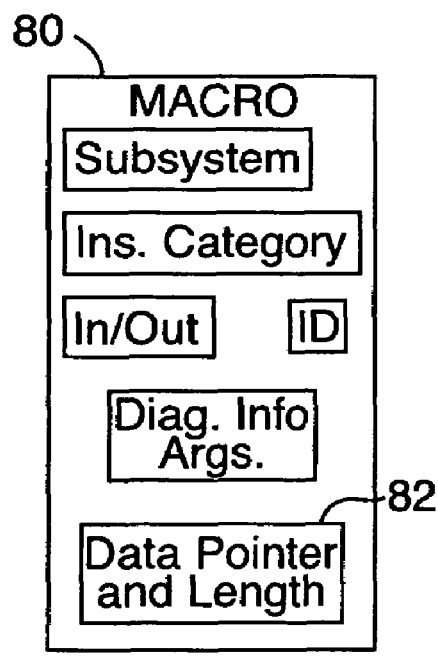
FIG. 4 is a schematic diagram of a data array recordation macro portion of the diagnostics tool.
Figure 5:
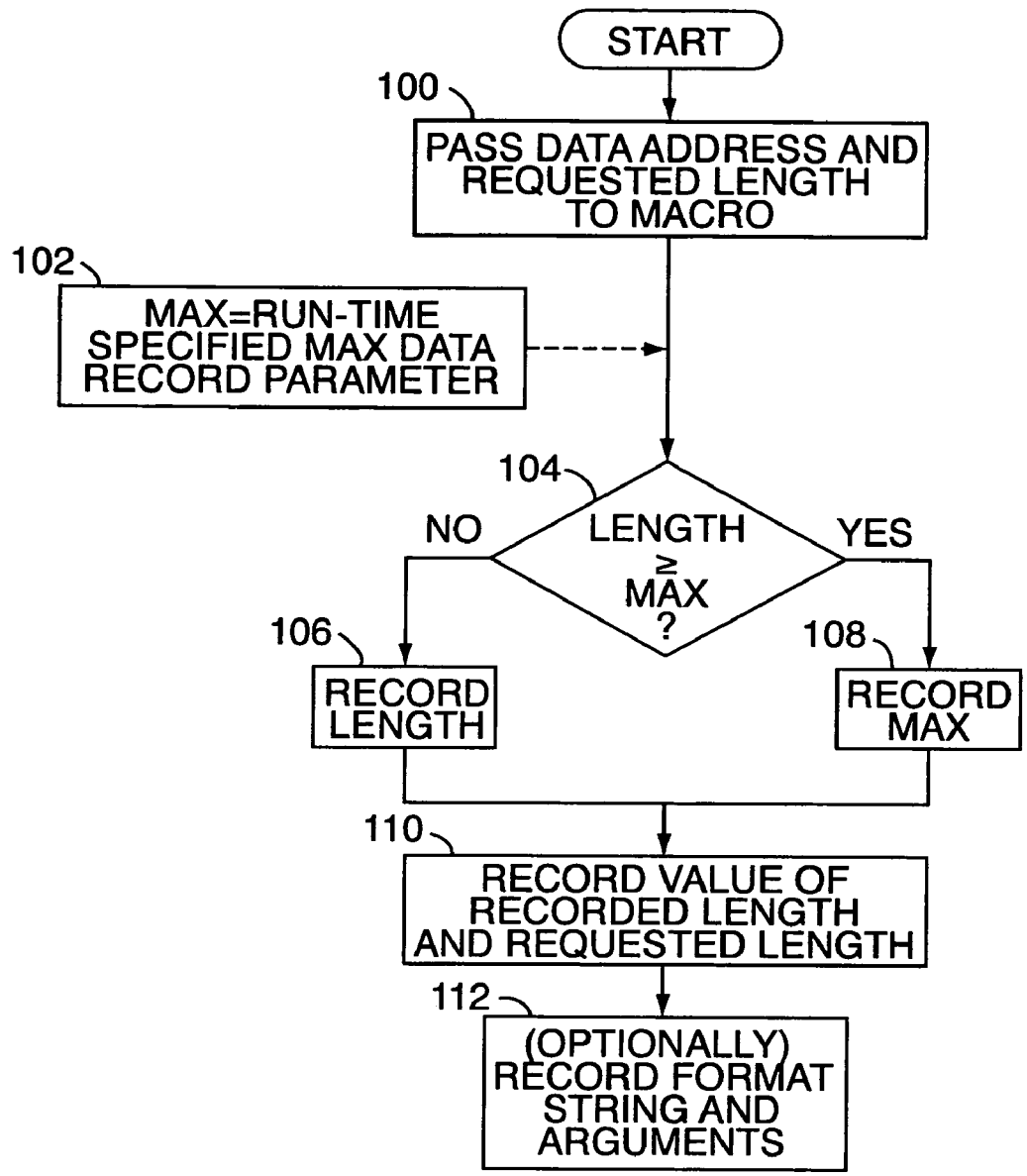
FIG. 5 is a flowchart showing the operation of the data array recordation macro shown in FIG. 4.

With reference to FIGS. 4 and 5, as an additional part of the diagnostics tool 10, an array recordation means, e.g., an instrumentation macro 80 or other code, may be provided which enables the recording of an array of data of specified length. At Step 100, the address of the data to be recorded and a requested length 82 are passed to the macro 80. Provision is made at run-time to specify, at Step 102, a per-log (and possibly per subsystem/category) parameter that specifies the maximum data length to be recorded by such a macro. This is done independently from the macro's operation. At Step 104, a determination is made of the smaller number of bytes of data between the requested length and the specified maximum data length to be recorded. At Step 106, if the requested length is less than the maximum, the requested number of bytes of the array of data is recorded, beginning with the data at the address passed in Step 100. Otherwise, at Step 108, the maximum number of bytes of the array of data is recorded. Also recorded, at Step 110, are the value of the requested length, and the value of the recorded length. Optionally, a format specification string, and a variable number of parameters to be displayed according to the format string, may also be recorded by the macro, at Step 112. The macro 80 may have one or more additional arguments, as indicated in FIG. 4.

As noted, the software source code 32 is instrumented by including various instrumentation lines 15 therein, each of which invokes a macro 14. For example, say there are two macros ST_PRINTF( ) and ST_DATA( ), where the former provides custom "printf"-like formatting, and the latter records an array of data. Example instrumentation lines 15 invoking these macros in a sample function might look like this:

```
int myFunc(char *message, int messageLength)
   {
      ST_DATA(ST_ABC_MESSAGES, 123, messageLength,
         message);
   [and/or]
      ST_PRINTF(ST_ABC_FUNC_ENTRY, 124, "Entered
         function myFunc,
      message ptr = 0x%x, messageLength = %d\n",
      (unsigned int)message, messageLength);
      ...
   }
```

Functionally, these instrumentation lines are single lines or statements that do nothing other than invoke a macro (invoking the macro includes passing arguments to the macro), which would be true even if the instrumentation line was interspersed with carriage returns, i.e., arrayed on multiple display lines as displayed or printed.

Since certain changes may be made in the above-described real-time software diagnostics tool, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A method for instrumenting software comprising the steps of:
   passing one or more arguments to a macro in an instrumentation line that invokes the macro; and
   determining whether or not the instrumentation line is compiled to form a corresponding instance of instrumentation code, at least partly based on at least one of the one or more arguments, wherein the one or more arguments specify at least two dimensions; and the method further comprises the step of determining at run-time whether or not the instance of instrumentation code is enabled for recording diagnostic information to a log, at least partly based on the at least two dimensions, wherein no function call overhead is incurred if disabled.

2. The method of claim 1 wherein:
   at least one of the one or more arguments has at least one associated compile-time value; and
   the determination of whether or not the instrumentation line is compiled to form the corresponding instance of instrumentation code is at least partly based on the at least one associated compile-time value.

3. The method of claim 1 wherein:
   the method further comprises the step of outfitting the software with at least one header file containing one or more definitions related to the one or more arguments; and
   the determination of whether or not the instrumentation line is compiled to form a corresponding instance of instrumentation code is at least partly based on the one or more definitions.

4. The method of claim 1 further comprising the steps of: passing at least one format specifier to the macro in the instrumentation line for formatting the diagnostic information, wherein the formatting performed by the format specifier is defined in the instrumentation line; recording into the log at least one identifier for ascertaining the at least one format specifier at a later time; and recording the diagnostic information to the log without formatting the diagnostic information according to the at least one format specifier.

5. A method for diagnosing software comprising the steps of:
   passing one or more arguments to a macro in an instrumentation line that does nothing other than invoke the macro, wherein the one or more arguments specify at least two dimensions;
   compiling the instrumentation line to form a corresponding instance of instrumentation code; and
   determining at run-time whether or not the instance of instrumentation code is enabled for recording diagnostic information to a log, at least partly based on the at least two dimensions, wherein no function call overhead is incurred if disabled.

6. The method of claim 5 further comprising the step of: incurring overhead consisting of the equivalent of a single "if" statement if the instance of instrumentation code is disabled.

7. The method of claim 5 further comprising the step of: determining to which of a plurality of logs the instance of instrumentation code records diagnostic information to, based at least in part on the at least two dimensions.

8. The method of claim 7 further comprising the steps of: communicating diagnostic information from the plurality of logs for user examination separately from the instance of instrumentation code recording the diagnostic information; and communicating diagnostic information from at least one of the plurality of logs for user examination while diagnostic information is being recorded to the plurality of logs.

9. The method of claim 5 wherein:
the software has a plurality of instances of instrumentation code including the corresponding instance of instrumentation code; and
the method further comprises the step of recording at least one ID along with the diagnostic information, wherein the at least one ID may be specified so as to at least partly uniquely distinguish any given instance of instrumentation code from all other instances of instrumentation code in the software.

10. The method of claim 9 further comprising the step of utilizing the at least one ID for an action selected from the group consisting of:
specifying sequences upon which to start or stop logging; invoking processing at record time; post-processing of diagnostic information; generating a record of encountered instances of instrumentation code; and identifying for a post-processor constant information present in software source code but absent from both software object code and recorded diagnostic information.

11. The method of claim 5 further comprising the steps of, upon the occurrence of a stimulus:
stopping or starting the recording of the diagnostic information; and
starting or stopping other logging in progress on other processors in an intercommunicating system of processors that includes a processor executing the software.

12. The method of claim 5 further comprising the step of:
dynamically creating the log at run-time from free memory, and selectively at one or more specified locations in the free memory.

13. The method of claim 5 further comprising the step of:
time stamping the recorded diagnostic information.

14. The method of claim 5 further comprising the step of:
recording an array of data of a requested length if the instance of instrumentation code is enabled.

15. The method of claim 14 wherein:
the method further comprises the step of passing one or more arguments to the macro in the instrumentation line that specify at least one of a format specifier and a discrete software parameter that conveys additional diagnostic information; and
the step of recording the array of data comprises recording the smaller of the requested length and a run-time specified limit on the actual recorded length.

16. The method of claim 5 further comprising the steps of:
selectively examining the contents of a specified region of memory upon recording the diagnostic information to a log; and
conditionally or unconditionally generating a record containing information about the contents of the specified region of memory.

17. A software diagnostic method comprising the steps of:
specifying at least one format specifier in an instrumentation line configured to record software diagnostic information into a log, wherein:
the format specifier is configured for formatting the diagnostic information; and
the formatting performed by the format specifier is defined in the instrumentation line;
recording the diagnostic information to the log without formatting the diagnostic information according to the format specifier;
recording to the log, along with the diagnostic information, at least one identifier for ascertaining the format specifier at a later time;
communicating the diagnostic information from the log for user examination; and
concurrently with or subsequent to said step of communicating the diagnostic information, formatting the diagnostic information according to the format specifier as ascertained from the at least one identifier.

18. The method of claim 17 wherein the at least one identifier identifies a physical address in software object code which contains the format specifier.

19. The method of claim 17 further comprising the step of:
passing one or more arguments to a macro in the instrumentation line, wherein the instrumentation line invokes the macro;
wherein at least one of the one or more arguments at least partly identifies the at least one identifier, and wherein the format specifier is stored someplace other than in software object code.

* * * * *

UNITED STATES PATENT AND TRADEMARK OFFICE
CERTIFICATE OF CORRECTION

PATENT NO.       : 7,661,094 B2                                              Page 1 of 1
APPLICATION NO. : 11/125952
DATED            : February 9, 2010
INVENTOR(S)      : Blevin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1279 days.

Signed and Sealed this

Twenty-eighth Day of December, 2010

David J. Kappos
*Director of the United States Patent and Trademark Office*